(12) United States Patent
Schlüsselberger, Jr. et al.

(10) Patent No.: US 10,713,971 B2
(45) Date of Patent: Jul. 14, 2020

(54) FLIGHT SIMULATOR AND METHOD FOR FLIGHT SIMULATION

(71) Applicant: AMST-Systemtechnik GmbH, Ranshofen (AT)

(72) Inventors: Richard Schlüsselberger, Jr., Tiefgraben (AT); Michael Mayrhofer, Burgkirchen (AT); Rainer Schlüsselberger, Braunau am Inn (AT)

(73) Assignee: AMST-Systemtechnik GmbH, Ranshofen (AT)

( * ) Notice: Subject to any disclaimer, the term of this patent is extended or adjusted under 35 U.S.C. 154(b) by 261 days.

(21) Appl. No.: 15/555,060

(22) PCT Filed: Mar. 3, 2016

(86) PCT No.: PCT/EP2016/054548
§ 371 (c)(1),
(2) Date: Aug. 31, 2017

(87) PCT Pub. No.: WO2016/142268
PCT Pub. Date: Sep. 15, 2016

(65) Prior Publication Data
US 2018/0047298 A1      Feb. 15, 2018

(30) Foreign Application Priority Data

Mar. 6, 2015 (AT) .................................. 50178/2015

(51) Int. Cl.
*G09B 9/14* (2006.01)
*B21C 47/34* (2006.01)
(Continued)

(52) U.S. Cl.
CPC ............ *G09B 9/14* (2013.01); *B21C 47/3441* (2013.01); *G06T 19/006* (2013.01); *G09B 9/02* (2013.01);
(Continued)

(58) Field of Classification Search
CPC ... G09B 9/02; G09B 9/08; G09B 9/12; G09B 9/14; G09B 9/165; G09B 9/30;
(Continued)

(56) References Cited

U.S. PATENT DOCUMENTS 3,577,659 A * 5/1971 Kail ..................... B25J 17/0216
434/58
4,280,285 A * 7/1981 Haas ..................... G06F 11/277
434/30
(Continued)

FOREIGN PATENT DOCUMENTS

DE    10 2011 122 229 A1    6/2013
FR         2 687 491 A1    8/1993
(Continued)

OTHER PUBLICATIONS

Nieuwenhuizen et al., "Implementation and validation of a model of the MPI Stewart platform," *American Institute of Aeronautics and Astronautics*, 2010, 13 pages.
(Continued)

*Primary Examiner* — William H McCulloch, Jr.
(74) *Attorney, Agent, or Firm* — Seed IP Law Group LLP

(57) ABSTRACT

A flight simulator and flight simulation method, comprising a simulator cabin provided on a parallel kinematic device, wherein the simulator cabin has a maximum positive pitch position, in which the roll axis, proceeding from a horizontal direction, is inclined upwardly as far as possible within the range of the kinematic capabilities of the parallel kinematic device, while observing whatever control reserves that might be provided, and the operator is resultantly inclined toward the back, and wherein the first pitch angle is greater than 25°.

26 Claims, 5 Drawing Sheets

(51) Int. Cl.
*A63G 31/16* (2006.01)
*G09B 9/02* (2006.01)
*G09B 9/08* (2006.01)
*G06T 19/00* (2011.01)
*G09B 9/32* (2006.01)
*G09B 9/16* (2006.01)
*G09B 9/30* (2006.01)

(52) U.S. Cl.
CPC ............... *G09B 9/08* (2013.01); *A63G 31/16* (2013.01); *G09B 9/165* (2013.01); *G09B 9/30* (2013.01); *G09B 9/32* (2013.01)

(58) Field of Classification Search
CPC .......... G09B 9/307; G09B 9/32; A63G 31/16; G06T 19/006; B21C 47/3441
See application file for complete search history.

(56) References Cited

U.S. PATENT DOCUMENTS

| | | | | |
|---|---|---|---|---|
| 4,978,299 | A * | 12/1990 | Denne | G09B 9/14 434/58 |
| 5,060,932 | A * | 10/1991 | Yamaguchi | A63G 31/16 434/34 |
| 5,179,525 | A * | 1/1993 | Griffis | B23Q 1/5462 434/55 |
| 5,433,608 | A * | 7/1995 | Murray | G09B 9/14 434/29 |
| 5,490,784 | A * | 2/1996 | Carmein | A63B 22/02 434/29 |
| 5,511,979 | A * | 4/1996 | Perfect | G09B 9/14 434/55 |
| 5,564,985 | A * | 10/1996 | Engstrand | A63J 5/00 434/55 |
| 5,662,523 | A * | 9/1997 | Yasumaru | A63F 13/12 463/30 |
| 5,975,907 | A * | 11/1999 | Advani | A63G 31/16 434/29 |
| 5,980,256 | A * | 11/1999 | Carmein | A63B 22/02 434/29 |
| 7,180,476 | B1 * | 2/2007 | Guell | G01S 19/15 340/980 |
| 7,224,326 | B2 * | 5/2007 | Sefton | A63B 71/0622 345/8 |
| 7,479,967 | B2 * | 1/2009 | Bachelder | G06T 19/003 345/592 |
| 8,578,811 | B2 * | 11/2013 | Alet | B25J 9/0042 74/490.09 |
| 9,329,469 | B2 * | 5/2016 | Benko | G02B 27/017 |
| 10,022,636 | B2 * | 7/2018 | Schluesselberger | A63G 31/16 |
| 10,056,007 | B2 * | 8/2018 | Kirkman | G09B 9/04 |
| 10,096,166 | B2 * | 10/2018 | Wright | G06F 3/017 |
| 10,262,465 | B2 * | 4/2019 | Wright | G06F 3/011 |
| 10,380,907 | B2 * | 8/2019 | Schluesselberger | G09B 9/02 |
| 10,456,919 | B2 * | 10/2019 | Schluesselberger, Sr. | B25J 11/00 |
| 2005/0195128 | A1 * | 9/2005 | Sefton | A63B 71/0622 345/7 |
| 2007/0035561 | A1 * | 2/2007 | Bachelder | G06T 19/003 345/633 |
| 2008/0039216 | A1 * | 2/2008 | Higashiguchi | A63F 13/08 463/47 |
| 2008/0072699 | A1 * | 3/2008 | Vertechy | B25J 17/0266 74/480 R |
| 2008/0268404 | A1 * | 10/2008 | Burt | G09B 19/12 434/55 |
| 2011/0045446 | A1 * | 2/2011 | Glaser | G09B 9/12 434/59 |
| 2012/0180593 | A1 * | 7/2012 | Alet | B25J 9/0042 74/490.07 |
| 2013/0108992 | A1 * | 5/2013 | Buelthoff | G09B 9/02 434/33 |
| 2013/0257899 | A1 * | 10/2013 | Baron | G06F 30/00 345/619 |
| 2014/0087334 | A1 * | 3/2014 | Schlusselberger | G09B 9/14 434/29 |
| 2014/0180508 | A1 * | 6/2014 | Zaneboni | B64D 45/00 701/14 |
| 2016/0148526 | A1 * | 5/2016 | Morris | G09B 9/04 434/62 |
| 2016/0371888 | A1 * | 12/2016 | Wright | G06F 3/011 |
| 2016/0379512 | A1 * | 12/2016 | Kirkman | G09B 9/04 434/34 |
| 2017/0216731 | A1 * | 8/2017 | Schluesselberger | G09B 9/02 |
| 2017/0221376 | A1 * | 8/2017 | Gosselin | B25J 9/0072 |
| 2017/0316613 | A1 * | 11/2017 | Wright | G06F 3/011 |
| 2017/0330381 | A1 * | 11/2017 | Wright | G02B 27/017 |
| 2018/0032139 | A1 * | 2/2018 | Whiteford | G06F 3/011 |
| 2018/0033157 | A1 * | 2/2018 | Whiteford | G06T 7/557 |
| 2018/0033328 | A1 * | 2/2018 | Whiteford | G09B 9/08 |
| 2018/0047298 | A1 * | 2/2018 | Schlusselberger, Jr. | G09B 9/14 |

FOREIGN PATENT DOCUMENTS

| | | |
|---|---|---|
| WO | 99/38646 A1 | 8/1999 |
| WO | 2012/030211 A1 | 3/2012 |
| WO | 2013/178828 A1 | 12/2013 |

OTHER PUBLICATIONS

© ProFlight 2014, "The Perfect Illusion: Full Flight Simulator Technology," URL=http://www.proflight.com/de/full-flight-simulatoren/technologie.php, accessed Dec. 19, 2019, 3 pages.

* cited by examiner

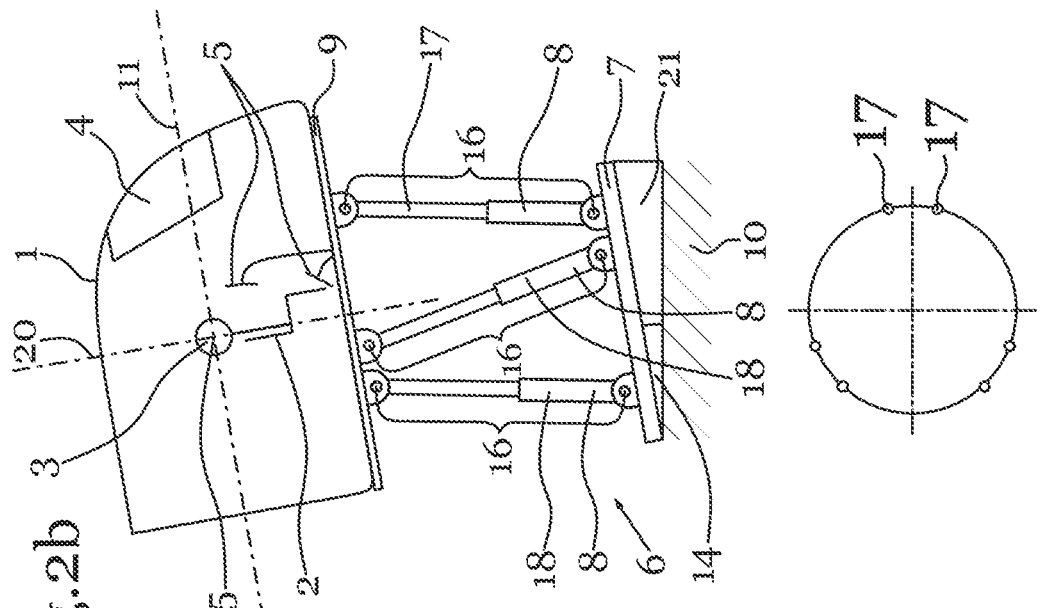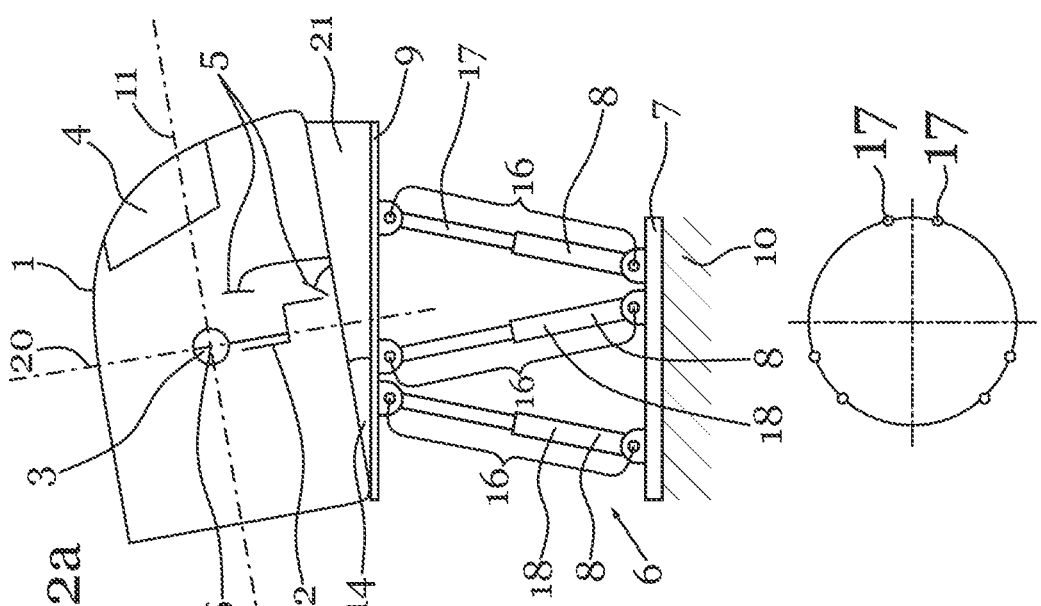

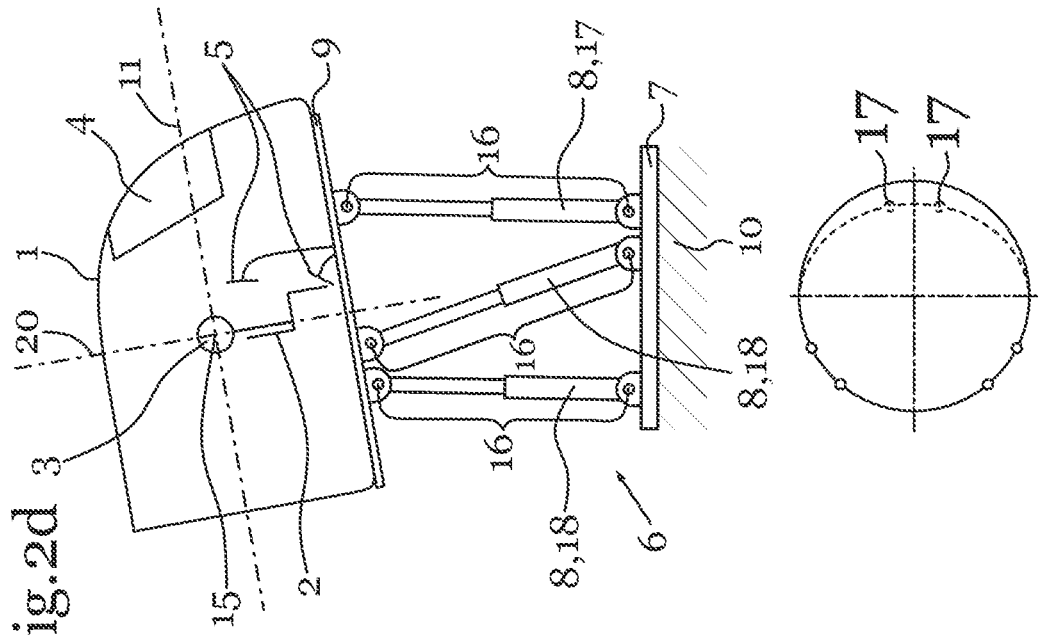
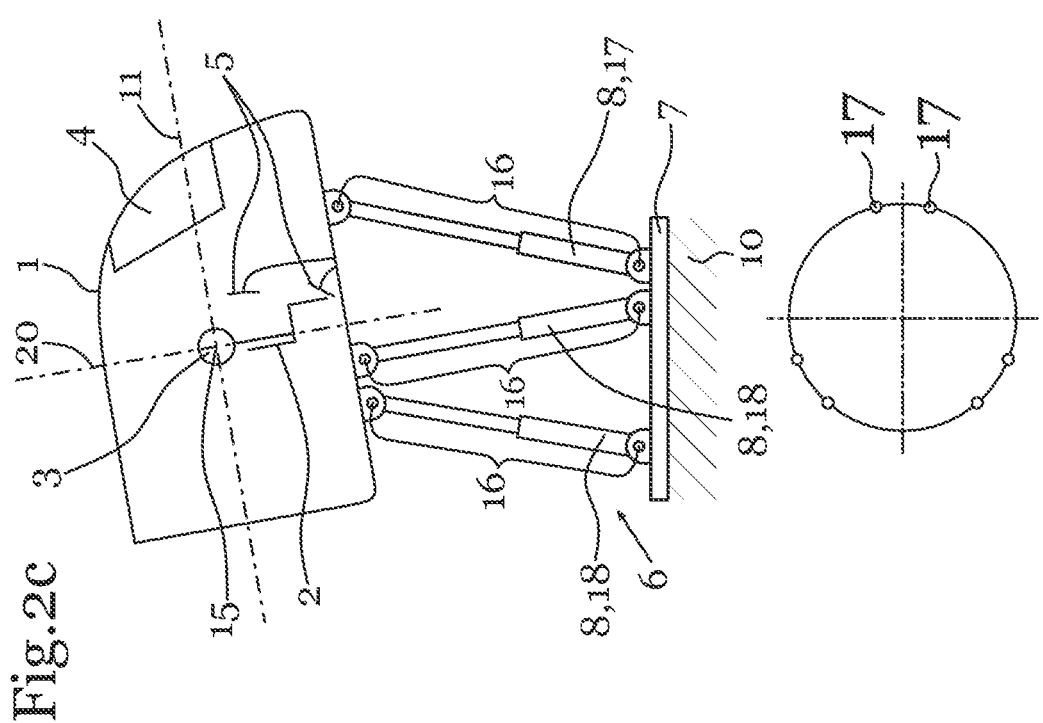

FLIGHT SIMULATOR AND METHOD FOR FLIGHT SIMULATION

BACKGROUND

Technical Field

The disclosure relates to a flight simulator as well as to a flight simulation method according to the preamble of the independent claims.

Description of the Related Art

Flight simulators are known and publicized in various configurations. For example, flight simulators are known in which a simulator cabin is arranged on a floor-standing hexapod. A hexapod is a configuration of a parallel kinematic device in which a carrier can be moved relative to a base along six degrees of freedom by changing the lengths of individual linear motion devices. These six degrees of freedom correspond to three rotational and three translational degrees of freedom.

Such hexapods are standard assemblies, and used to move and control simulator cabins. The disadvantage to conventional flight simulators is that the special configuration of the hexapods limits freedom of movement. An inclination of the cabin around the pitch axis is limited to around ±20°, while observing the usual control reserves. This means that the person or simulator cabin can be tilted at most 20° toward the back and at most 20° toward the front. Consequently, the roll axis of the person or simulator cabin can only be tilted less than 20° toward the top or bottom proceeding from a horizontal direction, while observing the usual control reserves.

However, this freedom of movement is inadequate for simulating special flight situations. For example, one such a special flight situation is a so-called "full stall", during which a complete stall arises in crucial parts of the wings. To increase the freedom of movement, prior art proposes complicated structures intended to prevent a collision between the individual linear motion devices. In practice, however, such configurations can hardly succeed, because controlling these special arrangements is too complex to be economically implemented given small quantities. By contrast, control interfaces are present and known in conventional hexapods.

The freedom of movement or motion characteristics of conventional hexapod-based flight simulators (also referred to as envelope) is laid out based on worst-case scenarios, wherein the maximum positions of the simulator arise—only hypothetically—in these worst-case situations, while this is virtually never encountered during actual operation of the simulator. When simulating an actually probable stall, the inclination of the simulator cabin in conventional simulators is thus far removed from the maximum freedom of movement of the hexapod, so that the potentially available freedom of movement of the hexapod is in reality nowhere near exhausted.

As a result, a full stall cannot be simulated realistically enough in conventional hexapod-based flight simulators, but rather only a beginning or partial stall.

BRIEF SUMMARY

The object of the disclosure is now to provide a flight simulator and a flight simulation method which overcomes the disadvantages of prior art, thereby enabling an improved flight simulation. In particular, a person can be inclined by more than 20° or 25°, for example so that a full stall can be simulated in a sufficiently perceptually accurate manner, for example.

The objects according to the disclosure are achieved with the features in the independent claims.

Where applicable, the disclosure relates to a flight simulator, comprising:

A simulator cabin, wherein the simulator cabin incorporates a seat for an operator, if necessary an image display device for displaying the simulated environment, and preferably at least one control element for generating simulation control data, and in particular for controlling the simulated aircraft and having the operator influence the simulation, A parallel kinematic device that comprises a base, a carrier element and several linear motion devices, wherein the carrier element is connected with the base by at least three, preferably six, linear motion devices, and wherein the base is connected or coupled with the floor and the carrier element with the simulator cabin, if necessary, so that the simulator cabin is arranged on the parallel kinematic device or has a floor-standing design, wherein the simulator cabin has a basic position that essentially corresponds to a stationary, straight flight of the simulated aircraft, and in which the roll axis of the simulated aircraft or the operator essentially runs horizontally, wherein the simulator cabin has a maximum positive pitch position, in which the roll axis, proceeding from a horizontal direction, is inclined upwardly as far as possible by a first pitch angle within the range of the kinematic capabilities of the parallel kinematic device, while observing whatever control reserves that might be provided, and the operator is resultantly inclined toward the back, wherein the inclination preferably takes place around the pitch axis or around an axis parallel to the pitch axis, wherein the simulator cabin has a maximum negative pitch position, in which the roll axis, proceeding from a horizontal direction, is downwardly inclined by a second pitch angle within the range of the kinematic capabilities of the parallel kinematic device, while observing whatever control reserves that might be provided, and the operator is resultantly inclined toward the front, wherein the inclination preferably takes place around the pitch axis or around an axis parallel to the pitch axis, and wherein the first pitch angle is greater than 25°.

Where applicable, it is provided that the value of the first pitch angle be greater than the value of the second pitch angle, or that the value of the first pitch angle be greater by a differential angle than the value of the second pitch angle.

Where applicable, it is provided that the inclination of the simulator cabin around the pitch axis or around the axis parallel to the pitch axis between the maximum negative pitch position and the maximum positive pitch position take place exclusively by actuating the parallel kinematic device.

Where applicable, it is provided that the linear motion devices be designed as linear motion devices with a variable length that can be controlled or regulated, wherein the length of the linear motion devices lies between or within a range of a minimum length and a maximum length, so that the carrier element can be pivoted relative to the base by at least two axes via changes in the length of the linear motion devices, and potentially has three pivoting degrees of freedom and three translational degrees of freedom.

Where applicable, it is provided that the linear motion devices be arranged in pairs, wherein two linear motion devices comprising a linear motion device pair are inclined relative to each other, thereby forming a hexapod in particular.

Where applicable, it is provided that the parallel kinematic device have a parallel kinematic basic position, in which the base and the carrier element essentially run parallel, and that the parallel kinematic device is arranged in a position deviating from the parallel kinematic basic position when the simulator cabin is arranged in its basic position.

Where applicable, it is provided that the parallel kinematic device have a parallel kinematic basic position, in which the base and the carrier element essentially run parallel, and that the base is inclined relative to the carrier element around the pitch axis or around an axis parallel to the pitch axis when the simulator cabin is arranged in its basic position.

Where applicable, it is provided that the parallel kinematic device have a parallel kinematic basic position, in which the base and the carrier element essentially run parallel, and in which the roll axis is upwardly inclined by a positive differential angle, and in which the simulator cabin is arranged in a position deviating from its basic position.

Where applicable, it is provided that the base be upwardly inclined by a positive differential angle relative to a horizontal plane, or that the roll axis be upwardly inclined by a positive differential angle relative to the direction of the carrier element, or that together the base be upwardly inclined relative to a horizontal plane and the roll axis be upwardly inclined relative to the direction of the carrier element by a positive differential angle, wherein the differential angle is preferably indicated in a normal plane of the pitch axis.

Where applicable, it is provided that a wedge arrangement shaped like a wedge or acting like a wedge and located between the base and the floor be provided for inclining the base relative to the horizontal plane.

Where applicable, it is provided that a wedge arrangement shaped like a wedge or acting like a wedge and located between the simulator cabin and carrier element be provided for inclining the roll axis relative to the direction of the carrier element.

Where applicable, it is provided that the wedge arrangement be a rigid wedge arrangement, the wedge angle of which remains unchanged during the simulation.

Where applicable, it is provided that all linear motion devices essentially have the same minimum and maximum lengths, and in particular are structurally identical in design, thereby forming a symmetrical parallel kinematic device.

Where applicable, it is provided that a front linear motion device or a front linear motion device pair as seen along the viewing direction of the operator have a larger maximum length than a rear linear motion device or a rear linear motion device pair, thereby forming an asymmetrical parallel kinematic device.

Where applicable, it is provided in the parallel kinematic basic position that the set-up angle of a front linear motion device or a front linear motion device pair as seen in the viewing direction of the operator be steeper than the set-up angle of a rear linear motion device or a rear linear motion device pair, thereby forming a symmetrical parallel kinematic device.

Where applicable, it is provided that the second pitch angle measure between −10° and −25°, that the second pitch angle measure between −10° and 22°, and/or that the second pitch angle measure between −19° and −21°.

Where applicable, it is provided that the first pitch angle measure between 25° and 35°, that the first pitch angle measure between 28° and 35°, that the first pitch angle measure between 29° and 35°, that the first pitch angle measure between 30° and 35°, that the first pitch angle measure between 32° and 35°, and/or that the first pitch angle measure between 29° and 31°, Where applicable, it is provided that the differential angle measure between about 2° and 20°, between about 2° and 12°, between about 3° and 10°, between 4° and 8° and/or about 5°.

Where applicable, it is provided that a rotating plate or rotating bezel be provided between the floor and base or between the carrier element and simulator cabin, so that the simulator cabin can rotate around a vertical axis, in particular around the yaw axis.

Where applicable, it is provided that a controlling device comprising a regulating model be provided for processing simulation control data and controlling the parallel kinematic device, wherein the controlling device can be used to bring the simulator cabin from the maximum positive pitch position into the maximum negative pitch position, wherein the maximum positive pitch position and maximum negative pitch position define the freedom of motion for the simulator cabin in terms of pitch.

Where applicable, the disclosure relates to a method for simulating flight on a flight simulator according to one of the preceding claims, comprising the following steps:

Actuating the parallel kinematic device, so that the simulator cabin is in its basic position, Subsequently actuating the parallel kinematic device, so that the simulator cabin is inclined toward the back from its basic position around the pitch axis or around an axis parallel to the pitch axis by a positive pitch angle of more than 25°.

Where applicable, it is provided that a stationary, straight flight be simulated by a first actuation of the parallel kinematic device, which brings the simulator cabin into its basic position, and that a full stall be simulated by a second actuation of the parallel kinematic device, which inclines the simulator cabin toward the back from its basic position around the pitch axis or around an axis parallel to the pitch axis by a positive pitch angle of more than 25°.

Where applicable, it is provided that the simulator cabin be inclined toward the back from the basic position around the pitch axis or around an axis parallel to the pitch axis by a positive pitch angle of more than 25° exclusively by actuating the parallel kinematic device.

Where applicable, it is provided that the positive pitch angle measure 28°, 29°, 30°, 31°, 32°, 33°, 34°, 35° or more.

Where applicable, it is provided that a stationary, straight flight be simulated by a first actuation of the parallel kinematic device, which brings the simulator cabin into its basic position, and that a stall or full stall be simulated by a second actuation of the parallel kinematic device, which inclines the simulator cabin toward the back from its basic position around the pitch axis or around an axis parallel to the pitch axis by a positive pitch angle of more than 25°, and that the simulated flight situation here deviate from a worst-case scenario drawn upon for interpreting the freedom of movement or motion characteristics of a conventional simulator.

Where applicable, it is provided that a stationary, straight flight be simulated by a first actuation of the parallel kinematic device, which brings the simulator cabin into its basic position, wherein the simulated speed is lower than the maximum speed of the simulated aircraft, and in particular is more than 10% lower than the maximum speed of the simulated aircraft, and that a stall or full stall be simulated by a second actuation of the parallel kinematic device, which inclines the simulator cabin toward the back from its basic position around the pitch axis or around an axis parallel to the pitch axis by a positive pitch angle of more than 25°, wherein the simulated speed is lower during the stall than the maximum speed of the simulated aircraft, and in particular is more than 10% lower than the maximum speed of the simulated aircraft, and hence deviates from a worst-case scenario drawn upon for interpreting the freedom of movement or motion characteristics of a conventional simulator.

Where applicable, the disclosure relates to a regulating model and/or a regulating method for any motion simulator, for example a motion simulator with a hexapod, a one-armed centrifuge, a multi-armed centrifuge, a one- or multi-armed centrifuge with movable carriage, wherein the motion simulator is suitable or set up for simulating an airplane, helicopter, vehicle and/or ship, in particular for simulating any means of transport, and wherein the regulating model and/or regulating method is/are configured according to FIG. 4, according to the description accompanying FIG. 4, and/or according to the entire specification.

Where applicable, the base is rigidly connected with the floor. Where applicable, the carrier element is rigidly connected with the simulator cabin.

Where applicable, the flight simulator in all embodiments is designed as a so-called "full flight flight simulator", in which the operator can control an aircraft in a simulated environment by using the control elements, and in which the sensory impressions arising in the respectively real flight situation are sufficiently or optimally simulated in a perceptually accurate manner for the operator. Where applicable, it is provided that the wedge angle of the wedge arrangement correspond to the differential angle.

For purposes of improved clarity, several terms will be defined below:

The roll axis corresponds to the axis that essentially follows the viewing direction with a relaxed view looking straight ahead. In particular, the roll axis is a horizontally running axis, for example one followed by an aircraft during stationary, straight flight.

In particular, the yaw axis is the axis that normally stands on the roll axis, and in particular runs essentially vertically or lies in a vertical plane. The pitch axis is the axis that normally stands on the two aforementioned axes. In particular, the pitch axis is a horizontal axis that runs from left to right or right to left. By definition, the pitch axis, yaw axis and roll axis preferably converge in a point or in an area. This point or area preferably lies in the area of the head of the operator. Where applicable, however, this point or area lies in an area remote from the head of the person. The directions of the axes are determined in particular by the properties of the aircraft to be simulated.

Where applicable, the parallel kinematic device is configured or adjusted in such a way that the front linear motion devices enable an elevated lift or expanded freedom of movement for the simulator cabin. In all embodiments, front denotes the direction lying at the front for the operator in the basic position of the simulator. For example, a centrally arranged linear motion device pair is provided at the front given a hexapod configuration. Two linear motion devices are laterally spaced apart from the vertical median longitudinal plane in the rear area of the parallel kinematic device. Where applicable, however, the simulator cabin is also turned by 90°, 180° or by some other angle relative to this configuration. The front linear motion devices are here always those linear motion devices that lie at the front as viewed by the operator in the basic position.

Where applicable, the simulator cabin in its basic position can thus have two linear motion devices at the front, in particular one linear motion device pair, and four linear motion devices at the back, in particular two linear motion device pairs.

In a configuration turned by 180°, the simulator cabin can be equipped at the front with four linear motion devices, in particular with two linear motion device pairs, and at the rear with two linear motion devices, in particular with one linear motion device pair.

These two configurations apply in particular for a parallel kinematic device designed as a hexapod. The simulator cabin is preferably symmetrically positioned on the hexapod or on the parallel kinematic device in the basic position, so that the freedom of movement toward the left and right is symmetrical in design given a rolling motion around the roll axis.

BRIEF DESCRIPTION OF THE SEVERAL VIEWS OF THE DRAWINGS

The disclosure will subsequently be described further based on the figures, wherein:

FIGS. 2a, 2b, 2c and 2d show schematic side views of different embodiments of flight simulators according to the disclosure, and thereunder a respective schematic view of where the parallel kinematic devices are attached.

DETAILED DESCRIPTION

Figure 1:
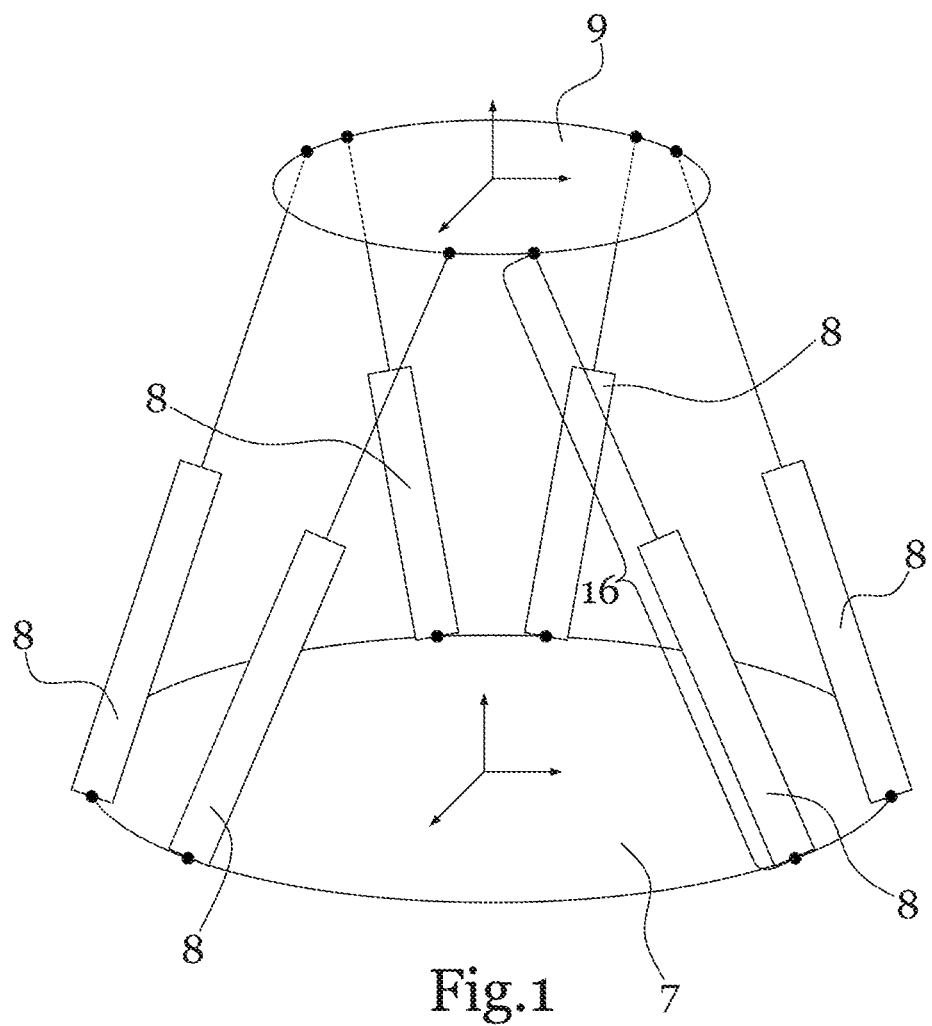
FIG. 1 shows a schematic inclined view of a parallel kinematic device.

Unless otherwise indicated, the reference numbers correspond to the following components: Simulator cabin 1, seat 2, operator 3, image display device 4, control element 5, parallel kinematic device 6, base 7, linear motion device 8, carrier element 9, floor 10, roll axis 11, first pitch angle 12, second pitch angle 13, differential angle 14, pitch axis 15, length (of linear motion device) 16, front linear motion device 17, rear linear motion device 18, rotating plate 19, yaw axis 20, wedge arrangement 21, flight model 22, perception model 23, target function 24, restriction(s) 25, optimal control or optimal regulating algorithm 26, perception model 27, simulator kinematic model 28, components of flight simulator to be regulated 29, optional feedback 30, control inputs 31.

FIG. 1 shows a schematic, inclined view of a conventional hexapod and in particular the kinematic configuration of a conventional hexapod, wherein this hexapod can potentially be used as a parallel kinematic device 6 in a flight simulator according to the disclosure.

The parallel kinematic device 6 comprises a base 7, a carrier element 9 and several linear motion devices 8. The linear motion devices 8 each have a variable length 16. The linear motion devices 8 are designed as hydraulic cylinders in all embodiments, for example. Where applicable, however, these linear motion devices 8 can also be designed as electrically driven linear motion devices or potentially as pneumatically driven linear motion devices in all embodiments. The linear motion devices 8 can be extended from a minimum length to a maximum length in a controlled or regulated manner. The linear motion devices 8 can also be stopped in each intermediate position, so that a specific length 16 is given. Changing the length of the linear motion devices 8 in a controlled manner makes it possible to move the carrier element 9 relative to the base. In particular, the carrier element 9 can be inclined relative to the base 7 by three rotational axes, and translationally moved along three degrees of freedom. The linear motion devices 8 potentially engage on the carrier element 9 and/or on the base 7 along a circle. In particular, these engaging points can be provided on the base 7 and/or on the carrier element regularly, symmetrically, torsionally symmetrically, rotationally symmetrically, or in a predetermined pattern. For example, two respective linear motion devices 8 are arranged in pairs, thus resulting in a linear motion device pair. The two linear motion devices 8 of a linear motion device pair are preferably not parallel to each other, but instead in particular are skewed or inclined relative to each other.

Where applicable, all linear motion devices 8 are structurally identical or configured with the same length or the same length range in all embodiments given a symmetrical parallel kinematic device 6 or a symmetrical hexapod. The linear motion devices 8 all have a minimum length and a maximum length, wherein these minimum and maximum lengths can potentially be identical for all linear motion devices 8. The base 7 preferably is floor-standing in design or connected with the floor. The carrier element 9 is preferably set up to carry the object to be moved, for example the simulator cabin 1. In particular, the simulator cabin 1 (not shown) is connected with the carrier element 9. The parallel kinematic device 6 preferably is floor-standing in design. Where applicable, the base 7 is connected with the floor 10. In all exemplary embodiments, for example, the floor 10 can be the flooring of a simulator hall or a foundation.

FIG. 2*a* shows a schematic side view of a possible embodiment of the flight simulator according to the disclosure. A simulator cabin 1 with a seat 2 for an operator 3, an image display device 4 along with control elements 5 is arranged on a parallel kinematic device 6. The seat serves to accommodate the operator 3. The image display device 4 is suitable and/or set up for displaying the simulated environment and/or other information. The control elements 5 are suitable and/or set up for generating control signals, so that the operator can influence the simulation. For example, the control elements 5 in all embodiments replicate the control elements of the aircraft to be simulated. The simulated aircraft can be moved and/or controlled in the simulated environment by actuating these control elements 5. A data processing system can be used to process the control data, so as to control or regulate the parallel kinematic device 6. Acceleration states that resemble or mirror those of simulated flight conditions can be played for the operator 3 by changing the position or inclination of the simulator cabin 1 and the seat 2 provided therein. In the present embodiment, the parallel kinematic device 6 is designed as a symmetrical parallel kinematic device 6. It comprises a base 7 that essentially horizontally follows the floor 10. The parallel kinematic device 6 further comprises a carrier element 9, which in the present position also runs essentially horizontally. In particular, the carrier element 9 essentially runs parallel to the base 7. This position of the parallel kinematic device 6 corresponds to the parallel kinematic basic position. In this position, all linear motion devices 8 preferably have the same length 16. The coupling points of the linear motion devices 8 are preferably symmetrically, uniformly or regularly distributed around the circumference on the base 7 or carrier element 9. The position of the simulator cabin 1 can be changed by varying the length of the linear motion devices 8. In the present embodiment, a wedge arrangement 21 is provided between the simulator cabin 1 and carrier element 9. This wedge arrangement 21 is schematically depicted as a wedge. However, it can be an arrangement that acts as a wedge in all embodiments. For example, the simulator cabin 1 can comprise a rigid floor plate or a rigid floor carrier, which is spaced apart from the carrier element 9 by a spacer element on one side, in particular in the front area, so that the simulator cabin 1 is inclined relative to the carrier element 9. This inclination preferably takes place around the pitch axis or around an axis parallel to the pitch axis. The angle for this inclination potentially corresponds to the differential angle 14 in all embodiments.

In the position shown on FIG. 2*a*, the simulator cabin 1 is not located in its basic position, but has rather been inclined toward the back by a specific angle around the pitch angle, and in particular toward the back by the differential angle. The pitch axis 15 projects in this view. In particular, it is located at the intersection between the roll axis 11 and yaw axis 20.

For example, this position corresponds to a position that in the simulated environment simulates a longitudinal acceleration of the aircraft or a climbing of the aircraft.

In the present embodiment, the parallel kinematic device 6 comprises six linear motion devices 8, as a result of which the parallel kinematic device 6 is designed as a hexapod. Three of the linear motion devices 8 are not shown, since they are aligned flush behind the three visible linear motion devices 8.

The features on FIG. 2*b* essentially correspond to the features on FIG. 2*a*, wherein the wedge arrangement 21 according to the embodiment on FIG. 2*b* is provided between the floor 10 and base 7. In this embodiment or in this position, the parallel kinematic device 6 is in its parallel kinematic basic position, in which all linear motion devices 8 have the same length 16, just as on FIG. 2*a*. In the present embodiment, the entire parallel kinematic device 6 is inclined by an angle, wherein the parallel kinematic device 6 is inclined around the pitch axis or around an axis parallel to the pitch axis. In particular, the parallel kinematic device 6 is inclined toward the back by the differential angle 14. The simulator cabin 1 is not in its basic position, but is rather also inclined toward the back. The parallel kinematic device 6 on FIG. 2*b* is also designed as a symmetrical parallel kinematic device 6.

In order to simulate a stationary, straight flight, during which the simulator cabin 1 is in its basic position, the length of the linear motion devices 8 is now varied in such a way that the simulator cabin 1 or operator 3 is essentially horizontally set. In particular in the configurations according to FIG. 2*a* or 2*b*, the front linear motion devices 17 are shortened relative to the rear linear motion devices 18 so as to arrange the simulator cabin 1 in its basic position. In this basic position, the roll axis 1 preferably runs horizontally. The yaw axis 20 preferably runs essentially vertically.

As a result of this configuration, the simulator cabin 1 is located in its basic position, and the parallel kinematic device 6 is located outside of the parallel kinematic basic position, thereby achieving the inventive effect of increasing the upward freedom of movement of an inclination around the pitch axis 15, wherein the downward freedom of movement of an inclination around the pitch axis is potentially decreased in the present configuration on FIG. 2*a* and FIG. 2*b*. In particular, the freedom of movement for a positive inclination around the pitch axis is increased toward the top by the differential angle 14, and toward the bottom by the differential angle.

FIG. 2c shows a schematic side view of another embodiment of a flight simulator, wherein the elements and features on FIG. 2c essentially correspond to the features on FIGS. 2a and 2b. In the present embodiment on FIG. 2c, the front linear motion devices 17 are longer in design than the rear linear motion devices 18. In particular, this means that the maximum lengths of the front linear motion devices 17 are larger than the maximum lengths of the rear linear motion devices 18. The upward freedom of movement around the pitch axis can be improved in this way as well.

FIG. 2d shows a schematic side view of another embodiment of a flight simulator according to the disclosure, wherein the components essentially correspond to the components of the preceding embodiments. In the present embodiment, all linear motion devices 8 have the same maximum length. However, the set-up angle of the front linear motion devices 17 is steeper than the set-up angle of the rear linear motion devices 17. The upward freedom of movement can be increased in this way as well. In particular, as shown below the inclined view in the schematic illustration of the points of attack for the linear motion devices 8, the points of attack for the front linear motion devices have edged closer to the center to achieve a steeper set-up angle.

Figure 3:
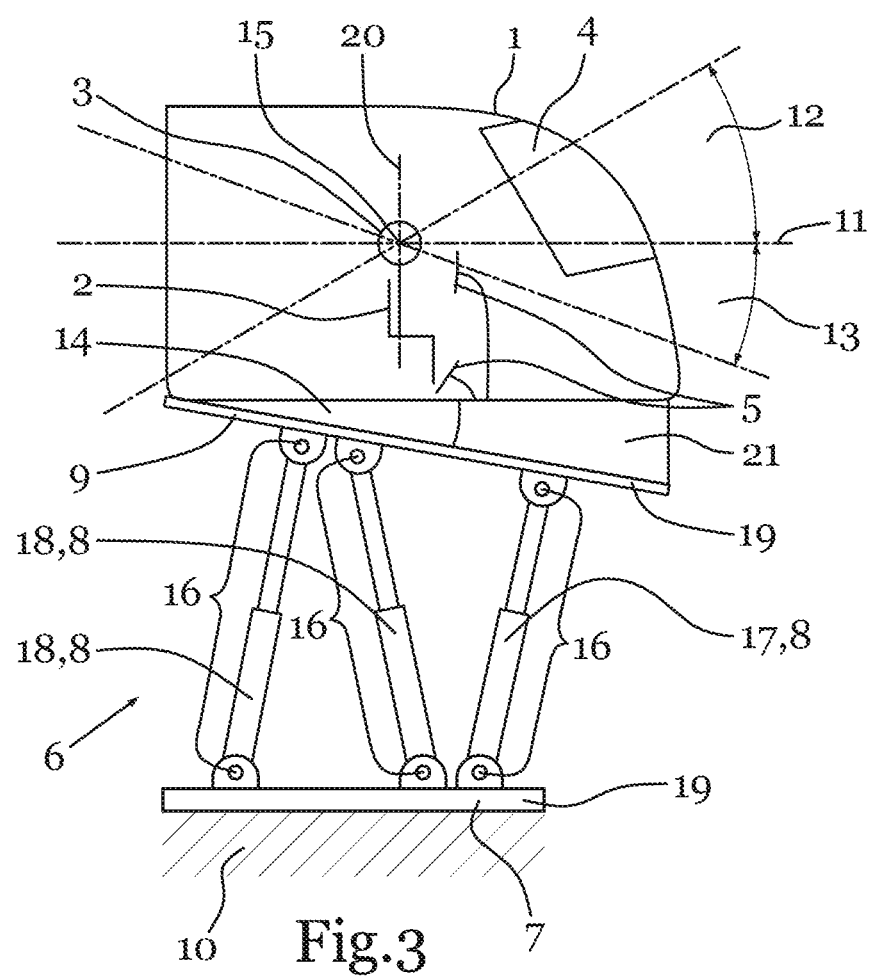
FIG. 3 shows a schematic side view of a potential embodiment of the disclosure.

FIG. 3 shows a schematic side view of the embodiment on FIG. 2a, wherein the simulator cabin 1 is in its basic position. The components and features of the flight simulator shown on FIG. 3 essentially correspond to the features of the preceding embodiments. The roll axis 11 essentially runs horizontally in the present depiction. The parallel kinematic device 6 is in a position deviating from the parallel kinematic basic position. In particular, the carrier element 9 is inclined by a specific angle, in particular by the differential angle 14.

As a result of this configuration, the simulator cabin 1 or roll axis 11 can be upwardly inclined from an essentially horizontal direction by a first pitch angle 12 and downwardly inclined by a second pitch angle 13, wherein the first pitch angle 12 is preferably greater than 25°. In particular, the value of the first pitch angle 12 is greater than the value of the second pitch angle 13, which yields an asymmetrical freedom of movement for the simulator cabin given an inclination around the pitch axis 15.

Where applicable, a rotating plate or rotating bezel 19 is provided. The simulator cabin 1 can be turned relative to the floor 10 by way of this rotating plate or rotating bezel. For example, the rotating plate 19 can be provided between the simulator cabin 1 and carrier element 9. Where applicable, the rotating plate 19 is provided between the floor 10 and base 7.

Figure 4:
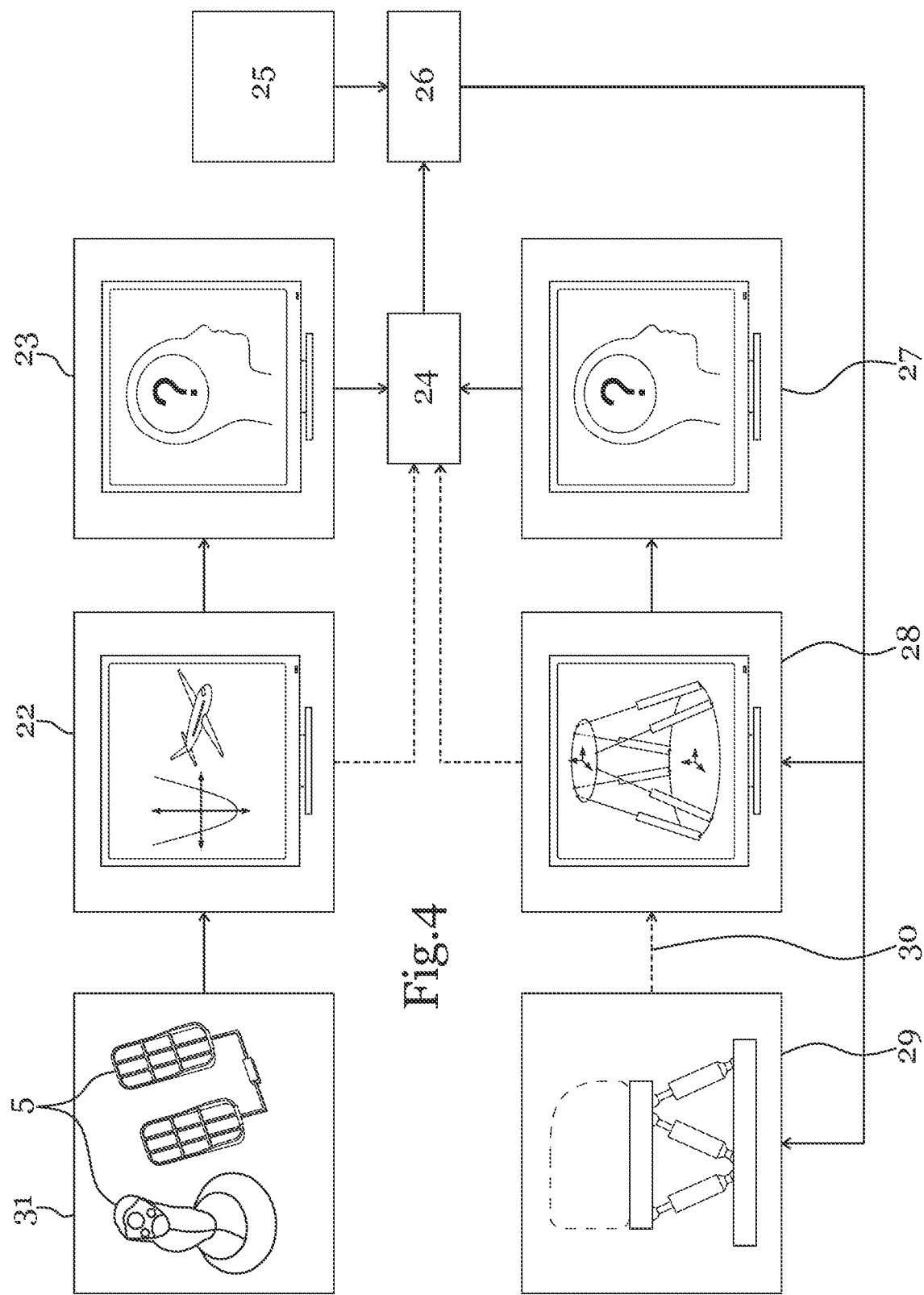
FIG. 4 shows an exemplary regulating model for a device according to the disclosure.

FIG. 4 shows a schematic structural design of a regulating model, in a regulating circuit for regulating and/or controlling a flight simulator, wherein the regulating circuit is preferably at least part of the data processing device, and in particular is a control device and/or a controlling device, which preferably is computer-implemented in design. The regulating model or regulating circuit is suitable for regulating a flight simulator in real time, in particular a so-called "full flight flight simulator", or controlling the movements of the simulator. This type of regulating model can be used for a flight simulator according to the present embodiments.

However, the regulating model can also be used to control and/or regulate other motion simulators, for example one-armed centrifuges, two-armed centrifuges with movable carriage, one-armed centrifuges with movable carriage or other motion simulators. In order to simulate any means of transport, for example a vehicle, a ship, a helicopter, etc., the flight model can be replaced by a model corresponding to the means of transport to be simulated in all embodiments of the disclosure. In order to simulate various airplane types or a special airplane type, the flight model can correspond to the respective airplane to be simulated or be adjusted thereto.

The motion filter or regulating model can be used for any flight simulators or motion simulators desired by changing out the motion simulator or the components of the flight simulator 29 and simulator kinematic model 28 to be regulated. The restrictions 25 are preferably also adjusted.

The regulating model preferably comprises control inputs 31, which are generated in particular by the control element 5 or by the control elements 5, a flight model 22, a perception model 23, a target function 24, an optimal control algorithm or an optimal regulating algorithm 26, restrictions 25, a perception model 27 and a simulator kinematic model 28. The components of the flight simulator 29 to be controlled or regulated are connected with the regulating circuit. One advantage to this regulating model, which is also referred to as a motion filter, is that the deviation between real motion and simulated motion corresponding to the target function is reduced to a minimum. Based upon the control data 31 for the operator, the flight model 22 calculates the motions acting on the operator, which are further processed in the perception model 23 to calculate the movements perceived by the pilot. The motions to be simulated are converted into corresponding parameters for the flight simulator, and in particular relayed to the simulator kinematic model 28, the output data of which are in turn further processed by a perception model 27 into the motions perceived or to be perceived by the operator. The difference between the output data of the two perception models 23 and 27 is optimized or minimized, so that the entire motion filter or entire regulating model produces an optimal simulation. The working space of simulator can be optimally utilized by actively considering the restrictions 25. As a result, interpretation based on "worst-case scenarios" is no longer absolutely required. For example, the restrictions are kinematic limits of the motion platform or flight simulator.

Where applicable, the two perception models 23, 27 are identical in all embodiments.

Where applicable, actually arising motion data for the flight simulator are returned to the regulating circuit by way of a feedback 30. Where applicable, the perception models can also be omitted, so that the output data for the flight model 22 and/or simulator kinematic model 28 are supplied directly to the target function 24. The dashed lines thus correspond to alternative embodiments, which can be provided in addition to the respective solid lines or as a replacement.

The regulating model disclosed on FIG. 4 and in the further specification permits a real-time regulation of flight simulators, in which a perceptually accurate simulation is improved or enabled.

The disclosure is defined in particular by the features in the claims, and not limited to the shown exemplary embodiments. In particular, combinations of features disclosed in the embodiments are also part of the disclosure. For example, parallel kinematic devices can be used, the linear motion devices of which are similar or structurally identical in design. In particular, the minimum lengths and maximum lengths of all linear motion devices can be roughly the same. In this embodiment as well, the front linear motion devices can be set up steeply, thereby increasing the upward freedom of movement around the pitch axis. In addition, the position of the simulator cabin can be inclined relative to the carrier element and/or the position of the entire parallel kinematic device can be inclined. An inclined position of parts of the parallel kinematic devices in combination with elongated front linear motion devices potentially also reflects the inventive idea.

An exemplary simulation sequence will be described to further illustrate a possible application:

For example, the initial situation involves a cruise flight of a civil airliner. In a first step, the flight speed in the simulation can be impermissibly reduced for different reasons, for example atmospheric disturbances, sensor defects, pilot error, etc. As a consequence, the angle of attack must be increased, so that a descent by the airplane can be prevented. If this situation now leads to a full-blown stall, a so-called stall, angles of attack exceeding 25° can arise, for example. This angle of attack is almost exactly reproduced by the flight simulator during the simulation, so as to achieve a realistic simulation. For training to be worthwhile, it is preferably required that a stall be simulated up to about 10° beyond the critical angle of attack. As a consequence, the flight simulator should be capable of realizing or simulating angles of attack exceeding 25°, and preferably ranging from about 30° to 35°. As a response to the stall, the pilot will now steer the aircraft downward into a type of dive, for example by about −15° to −20°, so that both the flow ratios and flight speed are again returned to the normal range. The aircraft is then intercepted in a targeted and cautious manner. For example, maximum angles of attack around the pitch axis of +30° to +35° and of −15° to −20° are encountered during this maneuver. An exact reproduction of the angle of attack is often not encountered in practice, since other accelerations acting on the person, for example a decrease in speed, i.e., a delay, or an increase in speed, i.e., an acceleration, are simulated by inclining the position of the simulator cabin. For example, these inclined positions lie within a range of at most 3-5°, which are subtracted from or added to the simulated flight attitude.

Where applicable, the flight simulator in all embodiments is designed in such a way that the simulator has a maximum pitch position, in which the roll axis, proceeding from a horizontal direction, is upwardly or downwardly inclined by a first or second pitch angle within the range of the kinematic capabilities of the parallel kinematic device, if necessary observing the control reserves. For example, the kinematic capabilities are limited by the structural design of the parallel kinematic device. However, these kinematic capabilities are only partially utilized in flight simulators, so that a control reserve is maintained.

Control elements are provided in the simulator cabin in order to control the flight simulator. For example, these control elements are modeled after controls of the aircraft to be simulated. In all embodiments, the simulator cabin can incorporate a cockpit that corresponds to the cockpit of the aircraft to be simulated.

In the simulator, the control elements are operated to relay control signals to a data processing device, in particular to a control device and/or regulating device. The data processing device, control device and/or regulating device can comprise one or several program-controlled computers, and be designed at least partially according to FIG. 4. In particular, a computer-implemented mathematical flight model is stored, which corresponds to a virtual motion model of the aircraft to be simulated. The simulation control data, for example the data of the control elements or potentially also disturbing influences, such as environmental influences, or targeted, artificial disturbing influences are transmitted to this computer-implemented flight model, where the reactions of the model to the control data are computed, preferably in real time. For example, the data of the flight model contain acceleration, speed and/or position data, which would impact the operator in the simulated environment, but also in reality.

During simulation, it is of paramount importance that the acceleration parameters or position parameters be simulated in as perceptually accurate a manner as possible. For this purpose, a potentially computer-implemented perception model can also be stored in the data processing device. This model comprises parameters about how specific acceleration states or changes are perceived by the operator. If necessary, the control data of the control elements are thus relayed to the flight model and to the perception model, and there processed preferably in real time to effect a perceptually accurate control or regulation of the simulator. This regulation is preferably a real time regulation, which in particular also considers data about the kinematic restriction of the parallel kinematic device and flight simulator. The data output by the regulating device are preferably sent to the parallel kinematic device to control or regulate its movement.

In addition, a potentially computer-implemented model of the simulator kinematics and/or motion characteristic of the parallel kinematic device can be stored. The control data are supplied to this model so as to simulate the motion of the simulator in the computer-implemented model. The simulation of the parallel kinematic device and output variables for this simulation can also be supplied to a computer-implemented perception model. In order to optimize the simulation, the difference between the output data of the perception model, flight model and perception model of the simulator model can subsequently be optimized or minimized. The optimized control data are then used to control the real parallel kinematic device. Where applicable, real data of the flight simulator, in particular position data or acceleration data, are returned, and returned to the regulating device via the perception model. The parameters of the perception model can be individually adjusted to the operator. The two perception models can be identical in design.

In an exemplary regulating model, for example the one described on FIG. 4, the simulator control data of the control elements are thus sent to a potentially computer-implemented flight model, from which the reactions of the simulated aircraft to the operation are then calculated. For example, the output variables are position or acceleration data. These are supplied to the potentially computer-implemented perception model so as to obtain parameters that correspond to the perceptions of the operator. The regulating circuit preferably also comprises a potentially computer-implemented model of the simulator kinematics, the output data of which are in turn supplied to a potentially computer-implemented perception model, the output data of which essentially correspond to the perception data generated by the simulator kinematics. The difference between the perception data owing to the control inputs and perception data of the simulator kinematics is preferably minimized. In addition, these data constitute an input variable for the regulating circuit. The regulating circuit is connected with the parallel kinematic device for controlling the parallel kinematic device. The goal of the algorithm is not primarily to minimize the physical deviation in motion, but rather to minimize the sensory deviation while complying with necessary restrictions, wherein physical deviations in motions can also be minimized. The working space of the simulator or parallel kinematic device can be optimally utilized by actively considering the restrictions. A configuration based on a "worst-case scenario" is no longer required. Instead of reproducing the physical motion, the sensation of motion is replicated, which leads to a more realistic simulation result. Sensation is a subjective criterion, meaning that every human perceives motion a bit differently. The perception model mirrors a basic characteristic of human perception, and can be adjusted to individual perception through individual parameterization. Where applicable, the system operator has the chance to respond to operator feedback or pilot feedback even during the simulation, so that the system behavior can be adjusted accordingly. The motion filter is not tied to a specific kinematic structure of the motion platform. Adjustments make it possible to also apply the algorithm to other platforms, for example one-armed centrifuges or multi-armed centrifuges. As opposed to the offline mode, the pilot can actively control the airplane during the real-time use of the present regulating device, in particular the regulating device according to FIG. 4, which explains the term "closed loop mode" commonly used in motion simulation. The control inputs of the operator are used to compute a reference trajectory, but the latter is potentially only known up to the current time, wherein a future progression can be predicted if needed. The path of the motion platform can be calculated according to this parameter in real time. One advantage to the present regulating device, in particular the regulating device according to FIG. 4, is that it addresses these two requirements: being able to resolve the optimization task in real time on the one hand, and being able to optimally follow an unknown reference motion on the other. The real time method is oriented to the idea of "model-based, predictive regulation" (English: model-predictive control, MPC), a regulating method that calculates optimal control variables by using a process model and taking restrictions into account. The term MPC here does not describe any special regulating algorithm, but denotes a class of model-supported regulating methods, which resolve a dynamic optimization problem on a moved horizon in real time. A process model is used to predict the ramifications of current and future manipulated variables and optimize them according to a desired objective functional.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a full flight simulator including:
      a simulator cabin, including:
         a seat;
         an image display device for displaying a simulated environment; and
         at least one control element configured to generate simulation control data, to control the simulator cabin based on input from an operator;
      a parallel kinematic device coupled to the simulator cabin including:
         a base configured to be coupled to a floor;
         a carrier element coupled to the simulator cabin; and
         at least 3 linear motion devices coupled to the base and the carrier element,
      wherein the simulator cabin is manipulatable from a basic position to a maximum positive pitch position and a maximum negative pitch position about a pitch axis, wherein the basic position corresponds to a position in which a roll axis of the simulator cabin is horizontal, and
      wherein the maximum positive pitch position corresponds to a position in which the roll axis is inclined upwardly at a first pitch angle about the pitch axis greater than 25° relative to the basic position, the first pitch angle being a maximum pitch angle within a range of the parallel kinematic device, and
      wherein the maximum negative pitch position corresponds to a position in which the roll axis is declined by a second pitch angle about the pitch axis, which is a maximum negative pitch angle within the range of the parallel kinematic device.

2. The device according to claim 1, wherein the first pitch angle is greater than the second pitch angle by an amount corresponding to a differential angle.

3. The device according to claim 2, wherein the differential angle measures between 2° and 20°.

4. The device according to claim 1, wherein manipulation of the simulator cabin around the pitch axis or around an axis parallel to the pitch axis between the maximum negative pitch position and the maximum positive pitch position is based exclusively on actuation of the parallel kinematic device.

5. The device according to claim 1, wherein the at least three linear motion devices each have a variable length between a minimum length and a maximum length, and
   wherein the carrier element is configured to be manipulated relative to the base along at least two axes via changes in the length of the plurality of linear motion devices.

6. The device according to claim 1, wherein the at least three linear motion devices includes six linear motion devices arranged in pairs in a hexapod configuration, wherein two linear motion devices comprising a linear motion device pair are inclined relative to each other.

7. The device according to claim 1, wherein the range of the parallel kinematic device includes a parallel kinematic basic position, in which the base and the carrier element are parallel, and
   wherein the parallel kinematic device is arranged in a position different from the parallel kinematic basic position when the simulator cabin is arranged in its basic position.

8. The device according to claim 1, wherein the range of the parallel kinematic device includes a parallel kinematic basic position, in which the base and the carrier element are parallel, and
   wherein the base is inclined relative to the carrier element about the pitch axis or around an axis parallel to the pitch axis when the simulator cabin is arranged in its basic position.

9. The device according to claim 1, wherein the parallel kinematic device has a parallel kinematic basic position, in which the base and the carrier element are parallel, and in which the roll axis of the simulator cabin is upwardly inclined relative to horizontal by a positive differential angle, and in which the simulator cabin is arranged in a position deviating from its basic position.

10. The device according to claim 1, wherein
the base is upwardly inclined by a positive differential angle relative to a horizontal plane,
or the roll axis is upwardly inclined by a positive differential angle relative to the carrier element,
or the base is upwardly inclined relative to a horizontal plane and the roll axis is upwardly inclined relative to the carrier element by a positive differential angle,
wherein the differential angle is in a normal plane of the pitch axis.

11. The device according to claim 1, further comprising:
a wedge located between the base and the floor and configured to incline the base relative to horizontal.

12. The device according to claim 11, wherein the wedge is rigid and has a constant wedge angle during operation of the full flight simulator.

13. The device according to claim 1, further comprising:
a wedge located between the simulator cabin and carrier element and configured to incline the roll axis relative to the carrier element.

14. The device according to claim 1, wherein the parallel kinematic device is a symmetrical parallel kinematic device with each of the at least three linear motion devices structurally identical in design with the same minimum and maximum lengths.

15. The device according to claim 1, wherein the parallel kinematic device is an asymmetrical parallel kinematic device with a front linear motion device or a front linear motion device pair of the at least three linear motion devices relative to a viewing direction of the operator through the image display device having a greater maximum length than a rear linear motion device or a rear linear motion device pair.

16. The device according to claim 1, wherein the parallel kinematic device is a symmetrical parallel kinematic device with a set-up angle of a front linear motion device or a front linear motion device pair of the plurality of linear motion devices relative to a viewing direction of the operator through the image display device being steeper in the parallel kinematic device basic position than a set-up angle of a rear linear motion device or a rear linear motion device pair of the plurality of linear motion devices.

17. The device according to claim 1, wherein the second pitch angle measures between −10° and −25° relative to horizontal.

18. The device according to claim 1, wherein the first pitch angle measures between 25° and 35° relative to horizontal.

19. The device according to claim 1, further comprising:
a rotating plate disposed between the floor and base or between the carrier element and the simulator cabin, the simulator cabin structured to rotate around a vertical yaw axis via the rotating plate.

20. The device according to claim 1, further comprising:
a controlling device configured to process the simulation control data and control the parallel kinematic device based on the simulation control data, the controlling device further configured to manipulate the simulator cabin, based on the simulation control data, from the maximum positive pitch position into the maximum negative pitch position, wherein the maximum positive pitch position and maximum negative pitch position define the range of motion for the simulator cabin with respect to pitch.

21. A method for simulating flight, comprising:
actuating a parallel kinematic device of a full flight simulator including a simulator cabin coupled to the parallel kinematic device, until the simulator cabin is in a basic position in which a roll axis of the simulator cabin is horizontal; and
actuating the parallel kinematic device until the roll axis of the simulator cabin is inclined from the basic position by a positive pitch angle of more than 25° relative to horizontal, including actuating the parallel kinematic device to incline the simulator cabin around a pitch axis.

22. The method according to claim 21, further comprising:
simulating a stationary, straight flight including actuating the parallel kinematic device a first time to position the simulator cabin into the basic position; and
simulating a full stall including actuating the parallel kinematic device a second time to incline the simulator cabin from the basic position around the pitch axis by a positive pitch angle of more than 25° relative to horizontal.

23. The method according to claim 21, wherein the simulator cabin is inclined from the basic position around the pitch axis by the positive pitch angle exclusively by actuating the parallel kinematic device.

24. The method according to claim 21, wherein the positive pitch angle is between 26° and 35°.

25. The method according to claim 21, further comprising:
simulating a stationary, straight flight by actuating the parallel kinematic device a first time to position the simulator cabin into the basic position; and
simulating a stall by actuating the parallel kinematic device a second time to incline the simulator cabin from the basic position around the pitch axis by a positive pitch angle of more than 25°.

26. The method according to claim 21, further comprising:
simulating a stationary, straight flight by actuating the parallel kinematic device a first time to position the simulator cabin in basic position, wherein a simulated speed is at least 10% less than a maximum speed of a simulated aircraft; and
simulating a stall by actuating the parallel kinematic device a second time to incline the simulator cabin from the basic position around the pitch axis by a positive pitch angle of more than 25°, wherein the simulated speed during the stall is at least 10% less than the maximum speed of the simulated aircraft.

* * * * *